(12) United States Patent
Deoka et al.

(10) Patent No.: US 7,028,152 B2
(45) Date of Patent: Apr. 11, 2006

(54) DIGITAL FRONT END PROCESSOR AND AUDIO DECODER SHARING A SINGLE EXTERNAL MEMORY

(75) Inventors: Yoshihiko Deoka, Tokyo (JP); Kazuaki Toba, Kanagawa (JP); Keisuke Yamaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 10/343,569

(22) PCT Filed: Jun. 7, 2002

(86) PCT No.: PCT/JP02/05683

§ 371 (c)(1),
(2), (4) Date: Jan. 31, 2003

(87) PCT Pub. No.: WO02/101740

PCT Pub. Date: Dec. 19, 2002

(65) Prior Publication Data

US 2003/0167370 A1    Sep. 4, 2003

(30) Foreign Application Priority Data

Jun. 11, 2001 (JP) .............................. 2001-176349

(51) Int. Cl.
*G06F 12/00* (2006.01)
(52) U.S. Cl. ...................................... 711/158; 386/109
(58) Field of Classification Search ................. 711/158
See application file for complete search history.

(56) References Cited

U.S. PATENT DOCUMENTS 6,701,065 B1 *   3/2004   Desai ........................ 386/109

* cited by examiner

*Primary Examiner*—Kevin L. Ellis
*Assistant Examiner*—Duc T Doan
(74) *Attorney, Agent, or Firm*—Jay H. Maioli

(57) ABSTRACT

A data processing device for taking out necessary packet data from a sector in which a plurality of packet data exist in a mixed manner includes an audio decoder unit that has, in parallel, an audio packet extraction unit for extracting an audio packet made up of audio data with respect to an input of sector data from an external memory connected to a front-end processor unit, a supplementary packet extraction unit for extracting a supplementary packet made up of supplementary data, and a frame information extraction unit. Thus, when collectively providing the front-end processor unit and the audio decoder unit on one chip, a buffer memory for the frame state can be omitted.

21 Claims, 16 Drawing Sheets

|   | #bits | format | value |
|---|---|---|---|
| Audio_Header(){ | | | |
| N_Packets | 3 | Unit 3 | 1..7 |
| N_Frame_Starts | 3 | Unit 3 | 0..7 |
| Reserved | 1 | Unit 1 | 0 |
| DST_Coded | 1 | Unit 1 | |
| for(p=1;p<=N_Packets;P++) | | | |
| { | | | |
| packet_Info()[p] | 16 | Packet_Info | |
| } | | | |
| for(f=1;f<=N_Frame_Starts;f++) | | | |
| { | | | |
| Frame_Info()[f] | 24or32 | Frame_Info | |
| } | | | |
| } | | | |

FIG.11

| | #bits | format | value |
|---|---|---|---|
| Frame_Info()[f]{ | | | |
| Time_Code[f] | 24 | Time_Code | |
| if (Frame_Format == 0/*==DST*/) | | | |
| { | | | |
| ch_Bit_1[f] | 1 | Unit 1 | |
| N_Sectors[f] | 5 | Unit 5 | 1..16 |
| ch_Bit_2[f] | 1 | Unit 1 | |
| ch_Bit_3[f] | 1 | Unit 1 | |
| } | | | |
| } | | | |

FIG.12

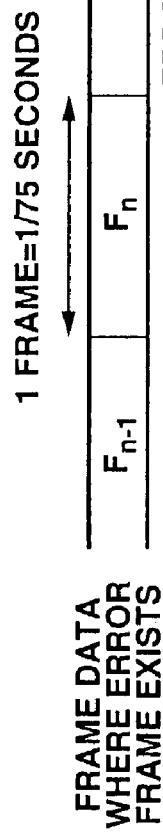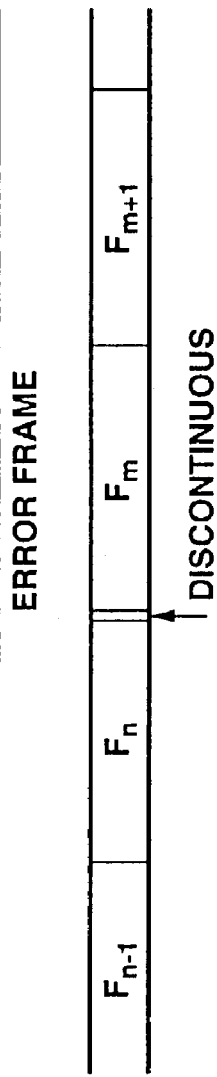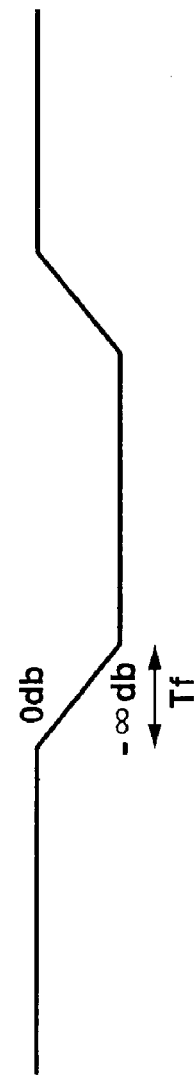
FIG.15A FIG.15B FIG.15C FIG.15D FIG.15E FIG.15F FIG.15G

DIGITAL FRONT END PROCESSOR AND AUDIO DECODER SHARING A SINGLE EXTERNAL MEMORY

TECHNICAL FIELD

This invention relates to a data processing device and a data processing method, and particularly to a data processing device and a data processing method for taking out necessary packet data from a sector in which a plurality of types of packet data exist in a mixed manner.

BACKGROUND ART

Conventionally, compact discs (CD) have been broadly used on which digital audio data having a sampling frequency fs of approximately 44.1 kHz with each sample having 16 bits for each channel are recorded. On the other hand, super audio compact discs (SACD) generated by the DSD (direct stream digital) system have been proposed on which audio stream data of the 1-bit system having a very high sampling frequency, for example, a frequency which is 64 times the sampling frequency fs of an ordinary CD, are recorded.

As will be described later, as over-sampling and ΔΣ modulation with 64 fs are performed on an input signal, a 1-bit audio digital signal is obtained. In a system of the CD format, decimation from a 1-bit signal to a multi-bit PCM code is carried out immediately after that, whereas on a SACD employing the DSD system, a 1-bit audio signal is directly recorded.

An audio data reproducing device for reproducing a 1-bit audio signal from a SACD will now be described. This audio data reproducing device has a structure as shown in FIG. 1.

On a SACD 1 from which data is reproduced by the audio data reproducing device shown in FIG. 1, a 1-bit audio signal is directly recorded as described above. The 1-bit audio signal recorded on the SACD 1 is generated by a ΔΣ modulator based on the DSD system as shown in FIG. 2. In the ΔΣ modulator, an adder 121 calculates a differential signal between the input signal as an audio signal inputted through an input terminal 120 and a 1-bit pulse string, and an integrator 122 integrates the differential signal. In this case, an audio band error is extracted. A process of converting this signal to a 1-bit pulse output by a quantizer 123 and feeding back the error again is repeated many times. Thus, a 1-bit audio signal is generated.

The SACD 1, on which the 1-bit audio signal is recorded, is mounted on a disc table of the audio data reproducing device shown in FIG. 1 and is rotated, for example at a constant linear velocity by a spindle motor, not shown. The SACD 1, which is being rotated, is irradiated with a reproducing laser beam emitted from an optical pickup 102 and the 1-bit audio signal is read out from the SACD 1. The optical pickup 102 is moved between the inner and outer circles of the SACD 1 by a feed mechanism, not shown, and thus scans the signal recording area of the SACD 1 with the reproducing laser beam to read the 1-bit audio signal recorded on the SACD 1.

The signal read out by the optical pickup 102 is supplied to an RF amplifier 103. An RF signal outputted from the RF amplifier 103 is supplied to a front-end processor unit 104. The front-end processor unit 104 uses an external memory 105 as a buffer for data or as a work area during error correction processing. The front-end processor unit 104 performs demodulation and error correction processing on the RF signal to generate sector data with a fixed length of 2064 bytes and supplies the sector data toe an audio decoder unit 106 on the subsequent stage.

The audio decoder unit 106 receives, by 1 byte each, the sector data of a fixed length of 2064 bytes supplied from the front-end processor unit 104. In the audio decoder unit 106, an audio header starting at, for example, the 13th byte from the leading part of each sector is analyzed by an audio header analyzer 111 and the data is recorded by frame into each block of an external memory 107, with each frame having 1/75 seconds.

The data recorded by frame in each block of the external memory 107 is decoded by a compression decoder 112 inside the audio decoder unit 106. After that, fader processing is performed on the data by a fader 113, when necessary, and the data is then converted to an analog audio signal by a D/A converter 108. The analog audio signal is supplied to an external amplifier, a speaker and the like through an output terminal 109.

When the data is recorded by frame into each block of the external memory 107 with each frame having 1/75 seconds while the audio header analyzer 111 analyzes the audio header, areas for recording an audio frame (FA) formed by connecting audio packets and a supplementary frame (FS) formed by connecting supplementary packets in the sector recorded in the external memory 105 shown in FIG. 3 are also separated in each block of the external memory 107 shown in FIG. 4. A padding packet and stuffing data shown in FIG. 3 are not recorded in each block, as shown in FIG. 4. The purpose of classifying the data by type into audio data and supplementary data and buffering the data by frame (FA, FS) in FIG. 4 is to quickly send the data to the compression decoder 112 on the subsequent stage which requests only frame-based audio data.

In each frame shown in FIG. 4, data is recorded with frame information added thereto, the frame information consisting of error information and a time code. The error information indicates that a frame including data which could not be error-corrected by the front-end processor unit 104 is an error frame. Since the time code is incremented by frame, discontinuity of frames can be detected by comparing the preceding and subsequent time codes.

The audio decoder unit 106 reads in advance the frame information IF recorded in the external memory 107 and therefore can send an error flag to the fader 113 before outputting a discontinuous point of frames due to an error frame, cue/review and tune selection, or the last data of the final frame in which recording is completed in the buffer, as a SDS signal. Therefore, the fader 113 can perform gradually attenuated fade-out processing on the DSD output, thus preventing occurrence of a strange sound.

In this manner, in the audio data reproducing device having the structure as shown in FIG. 1, the front-end processor unit 104 and the audio decoder unit 106 need the external memory 105 and the external memory 107, respectively.

Meanwhile, on the assumption that an IC for the front-end processor unit 104 and an IC for the audio decoder unit 106 are collectively provided on one chip in the above-described audio data reproducing device shown in FIG. 1, if a single external memory is used instead of the external memories 105 and 107 which are conventionally used by the front-end processor unit 104 and the audio decoder unit 106, respectively, there are advantages such as reduction in cost, reduction in power consumption, decrease in the number of IC pins and reduction in the board area.

If the conventional function of the external memory 105 connected to the front-end processor unit 104 and the function of the external memory 107 connected to the audio decoder unit 106 are to be provided in a new single memory by dividing the area of the memory on the basis of the address, as shown in FIG. 5, the frame state will be buffered after buffering of the sector status, and therefore the number of accesses to the memory increases. To guarantee the number of accesses, the frequency of a block for generating a control signal of the memory must be raised or the circuit within the IC must operate at high speed. Moreover, the priority control for the access right to the memory is complicated and the number of accesses to continuous addresses is reduced. Therefore, the advantage of the high-speed page mode cannot be fully utilized.

DISCLOSURE OF THE INVENTION

In view of the foregoing status of the art, it is an object of the present invention to provide a data processing device and a data processing method which enable collective provision of the external memories connected to the ICs of the front-end processor unit and the audio decoder unit, on one chip, by eliminating a buffer memory for the frame state.

In order to achieve the above-described object, a data processing device according to the present invention comprises: sector data generation means for performing predetermined signal processing on an input signal and thus generating fixed-length sector data for forming a variable-length frame; sector data storage means for storing the sector data generated by the sector data generation means; main packet extraction means for extracting main packet data from the sector data stored in the sector data storage means; and supplementary packet extraction means for extracting supplementary packet data from the sector data stored in the sector data storage means.

In the data processing device according to the present invention, main packet extraction means and supplementary packet extraction means are provided in parallel for extracting only specific types of packets, that is, main packet data and supplementary packet data, from data in which a plurality of types of packets exist in a mixed manner, and priority control of data request signals outputted from these packet extraction means is carried out. Thus, various packet data can be supplied to the subsequent block when necessary, without using a large-capacity data buffer.

Moreover, in this data processing device, an error signal for error fading can be sent to fade processing means at appropriate timing.

A data processing method according to the present invention comprises: a sector data generation step of performing predetermined signal processing on an input signal and thus generating fixed-length sector data for forming a variable-length frame; a main packet extraction step of extracting main packet data from sector data storage means in which the sector data generated by the sector data generation step is stored; a supplementary packet extraction step of extracting supplementary packet data from the sector data storage means; and a frame information extraction step of extracting frame information related to the variable-length frame from the sector data storage means; wherein an order of priority is set with respect to data request signals outputted from the main packet extraction step, the supplementary packet extraction step and the frame information extraction step, and respective packet data corresponding to the data request signals are outputted from the sector data storage means in accordance with the order of priority.

The other objects of the present invention and specific advantages provided by the present invention will be further clarified from the following detailed description of the structure with reference to the drawings.

BRIEF DESCRIPTION OF THE DRAWINGS

FIG. 11 shows the syntax of an audio header (Audio_Header).

FIG. 12 shows the syntax of frame information (Frame_Info).

FIGS. 15A to 15G are timing charts for explaining the operations of the audio data reproducing device when an error frame, discontinuous frames, and a final frame exist in frame data.

BEST MODE FOR CARRYING OUT THE INVENTION

Hereinafter, an optical disc reproducing device which has therein a data processing device according to the present invention and carries out a data processing method according to the present invention will be described with reference to the drawings.

Figure 6:
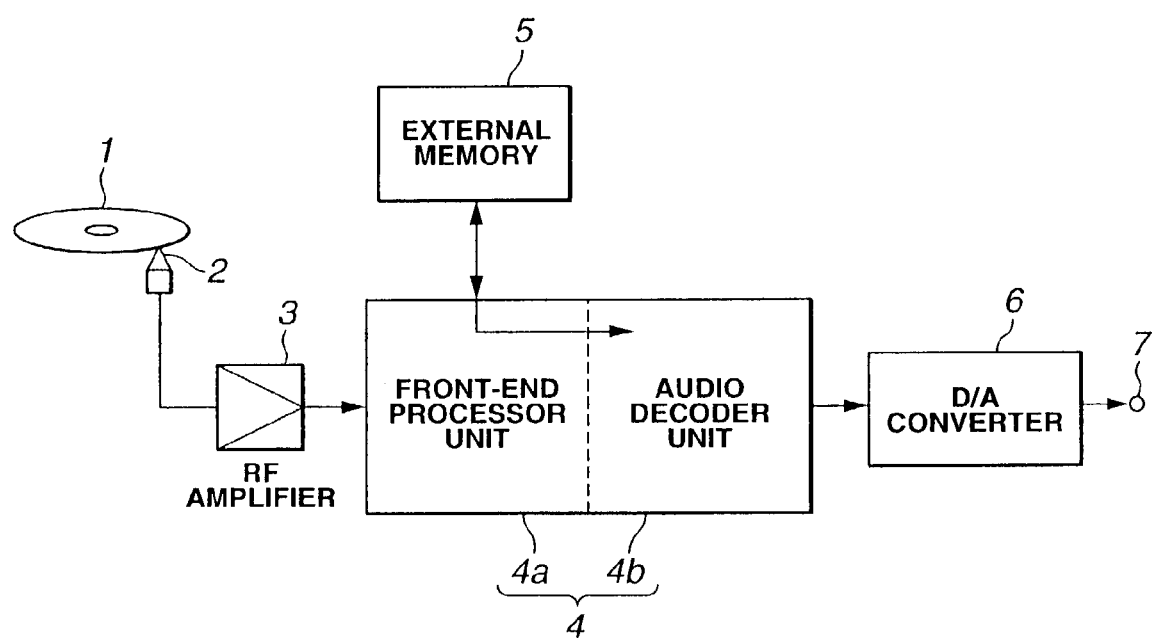
FIG. 6 is a block diagram showing an optical disc reproducing device to which the present invention is applied.

The optical disc reproducing device to which the present invention is applied has a structure as shown in FIG. 6 and carries out reproduction of data from a SACD-standard optical disc 1 on which a 1-bit audio signal generated by a ΔΣ modulator based on the DSD system is directly recorded.

The optical disc reproducing device has an optical pickup 2 for reading out a pit signal from the SACD-standard optical disc 1, an RF amplifier 3 for amplifying the pit signal read out by the optical pickup 2, a one-chip data processing device 4 including a front-end processor unit 4a and an audio decoder unit 4b, which will be described later, and a D/A converter 6 for converting audio data obtained by the data processing device 4 to an analog audio signal and supplying the analog audio signal to an output terminal 7, as shown in FIG. 6.

The front-end processor unit 4a constituting the one-chip data processing device 4 performs demodulation and error correction processing on the RF signal amplified by the RF amplifier 3 and thus generates sector data with a fixed length of 2064 bytes. The front-end processor unit 4a is connected with an external memory 5. The front-end processor unit 4a uses the external memory 5 for temporarily storing sector data and also uses the external memory 5 as a work area during the error correction processing. As the external memory 5, a synchronous DRAM is used.

The audio decoder unit 4b constituting the one-chip data processing device 4 decodes the sector data with a fixed length of 2064 bytes supplied from the front-end processor unit 4a and supplies the decoded data to the D/A converter 6. The audio decoder unit 4b does not need an external memory for buffering the frame state which would be used in a conventional SACD audio decoder. The audio decoder unit 4b also avoids using a built-in SRAM of its IC as a buffer. Since one frame consists of 16 sectors at the maximum, even a buffer for one frame needs a capacity of approximately 32 kbytes and therefore the built-in SRAM of the IC cannot be used as a frame buffer.

Figure 7:
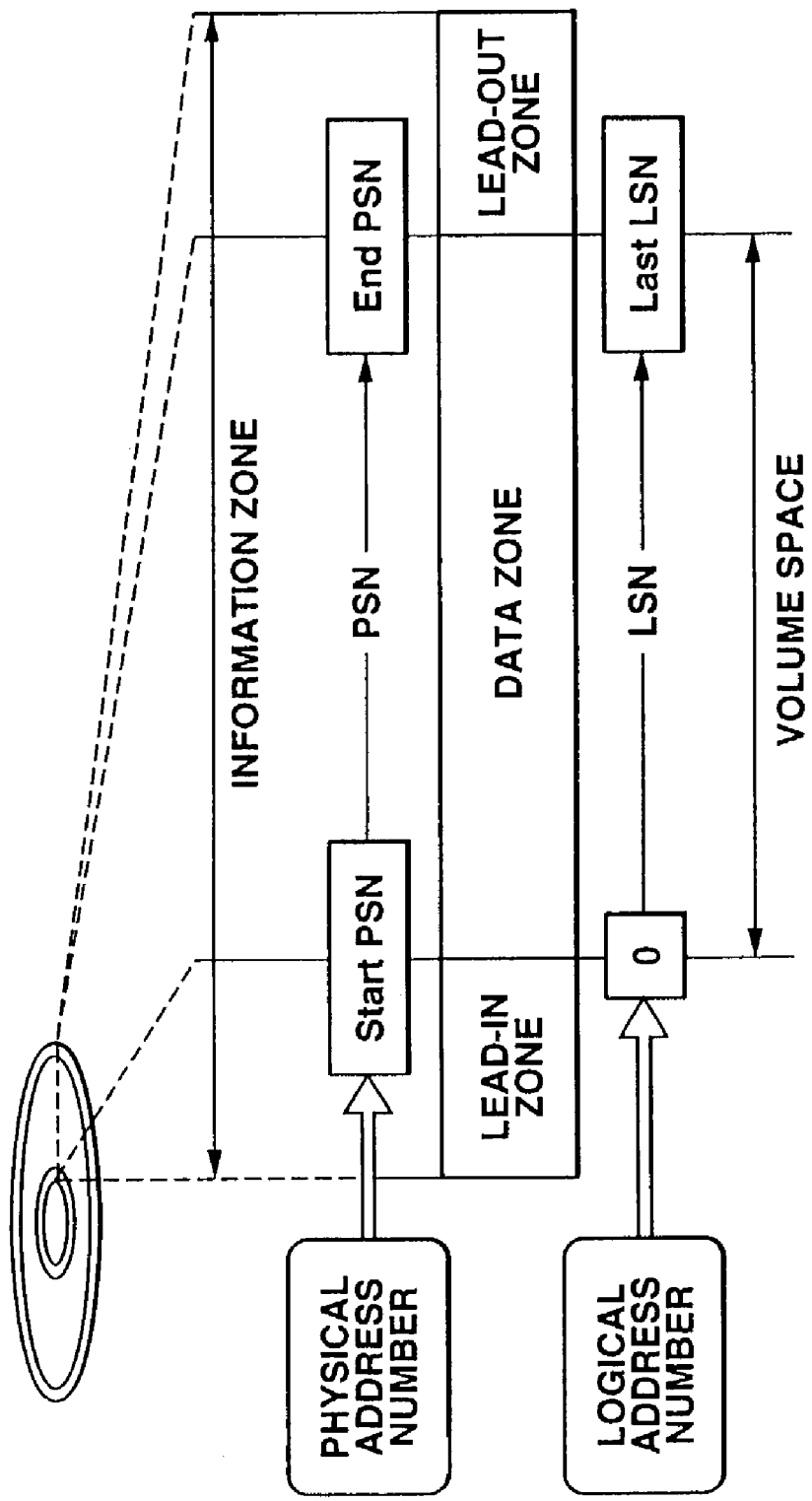
FIG. 7 shows the data structure of a SACD-standard optical disc from which data is reproduced by the optical disc reproducing device according to the present invention.

The structure of the SACD-standard optical disc 1 will now be described with reference to FIG. 7. This optical disc 1 is sectioned into three areas, that is, a lead0in zone, a data zone, and a lead-out zone, sequentially from the inner circumferential side to the outer circumferential side. These areas are collectively referred to as an information zone.

The optical disc 1 has a ROM structure so that data is recorded by sector in the data zone. Each sector has a physical address number (physical sector number) and a space for 2064 bytes per sector is prepared so that effective data of 2048 bytes can be recorded in each sector.

By using a logical address number (logical sector number) starting a "0" instead of the physical address number for the data zone, application data to be recorded in a volume space is managed.

Figure 8:
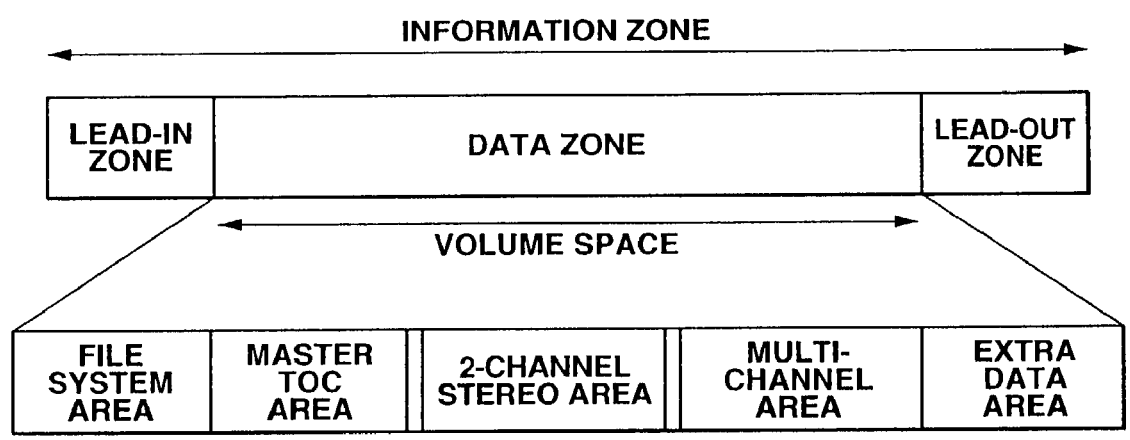
FIG. 8 shows a volume space of the SACD-standard optical disc.

The volume space is divided into five areas in accordance with the use of data, as shown in FIG. 8. Specifically, the five areas are a file system area, a master TOC area, a 2-channel stereo area, a multi-channel area, and an extra data area.

The file system area is an area having a file system recorded therein, which enables access in consideration of the use of the computer.

Figure 9:
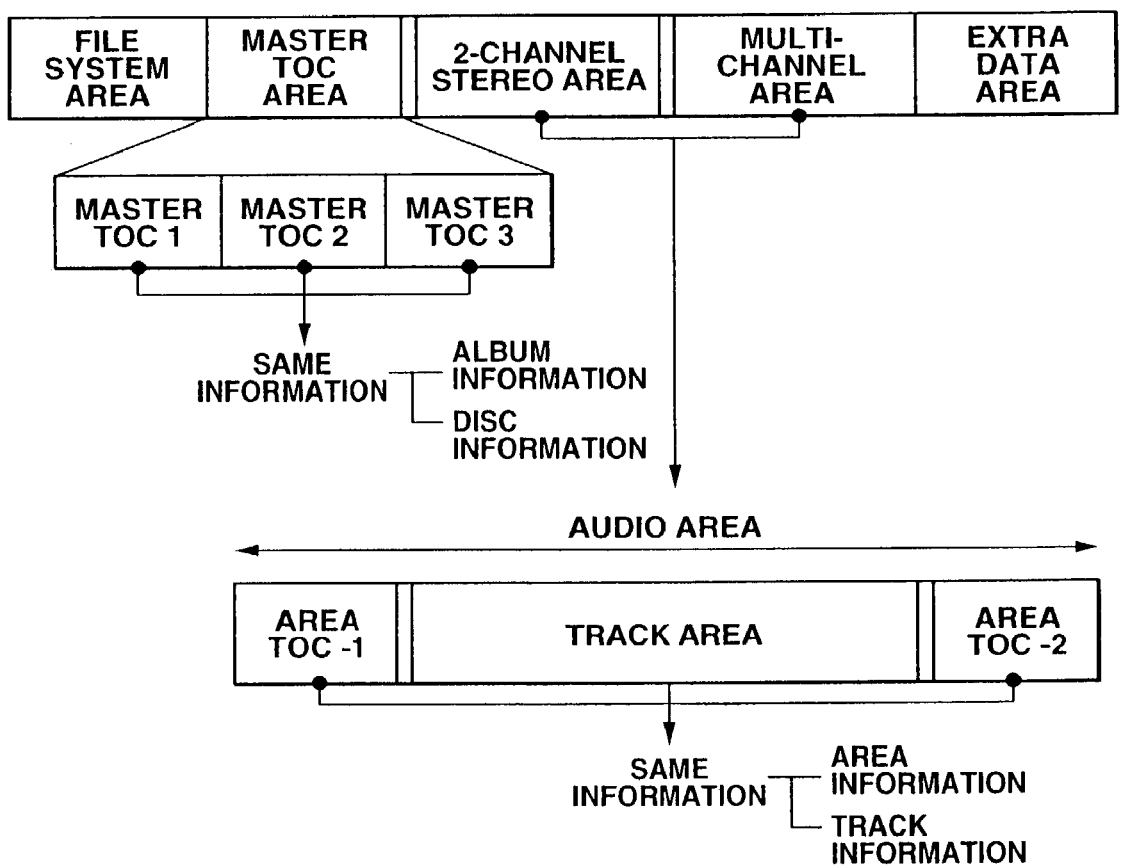
FIG. 9 shows the corresponding relation between TOC and information on the SACD-standard optical disc.

In accordance with the SACD standard, a dual TOC structure is employed which is made up of a master TOC and an area TOC based on and developed from the idea of TOC in a CD. In the master TOC area, the same master TOC indicating album information and disc information is recorded three times, as shown in FIG. 9. The area TOC will be described later.

In accordance with the SACD standard, a multi-channel mode as well as 2-channel stereo mode is possible and two independent area are prepared, that is, the 2-channel stereo area and the multi-channel area. As for the disc, three types of modes are possible, that is, only the 2-channel stereo mode, only the multi-channel mode, and both the 2-channel stereo mode and the multi-channel mode. In both the 2-channel stereo mode and the multi-channel mode, the DSD (direction stream digital) recording system is used as the coding system. Each channel constantly has data which is sampled by 1-bit, 64 Fs sampling (Fs=44.1 kHz).

In the volume space, the 2-channel stereo area and the multi-channel area have audio areas, respectively. For example, in the audio area of the multi-channel area, a track area having recorded therein a music signal based on the DSD (direction stream digital) recording system is arranged, and an area TOC-1 and area TOC-2 having stored therein the same data related to area information and track information are arranged before and after the track area, as shown in FIG. 9.

In the track area, a music signal based on the DSD recording system is recorded, as described above. Actually, however, audio data, which will be described later, and supplementary data are independently recorded. The supplementary data is equivalent to a subcode in a CD (signal that can be read out synchronously with the music signal). An independent data area is secured for the supplementary data. The audio data is sampled constantly under the same conditions for the respective channels in order to maintain predetermined quality, whereas the data quantity of the supplementary data can be selected in a scalable manner depending on the use.

The detailed structure of the data processing device 4 according to the present invention will now be described with reference to FIG. 10.

Figure 10:
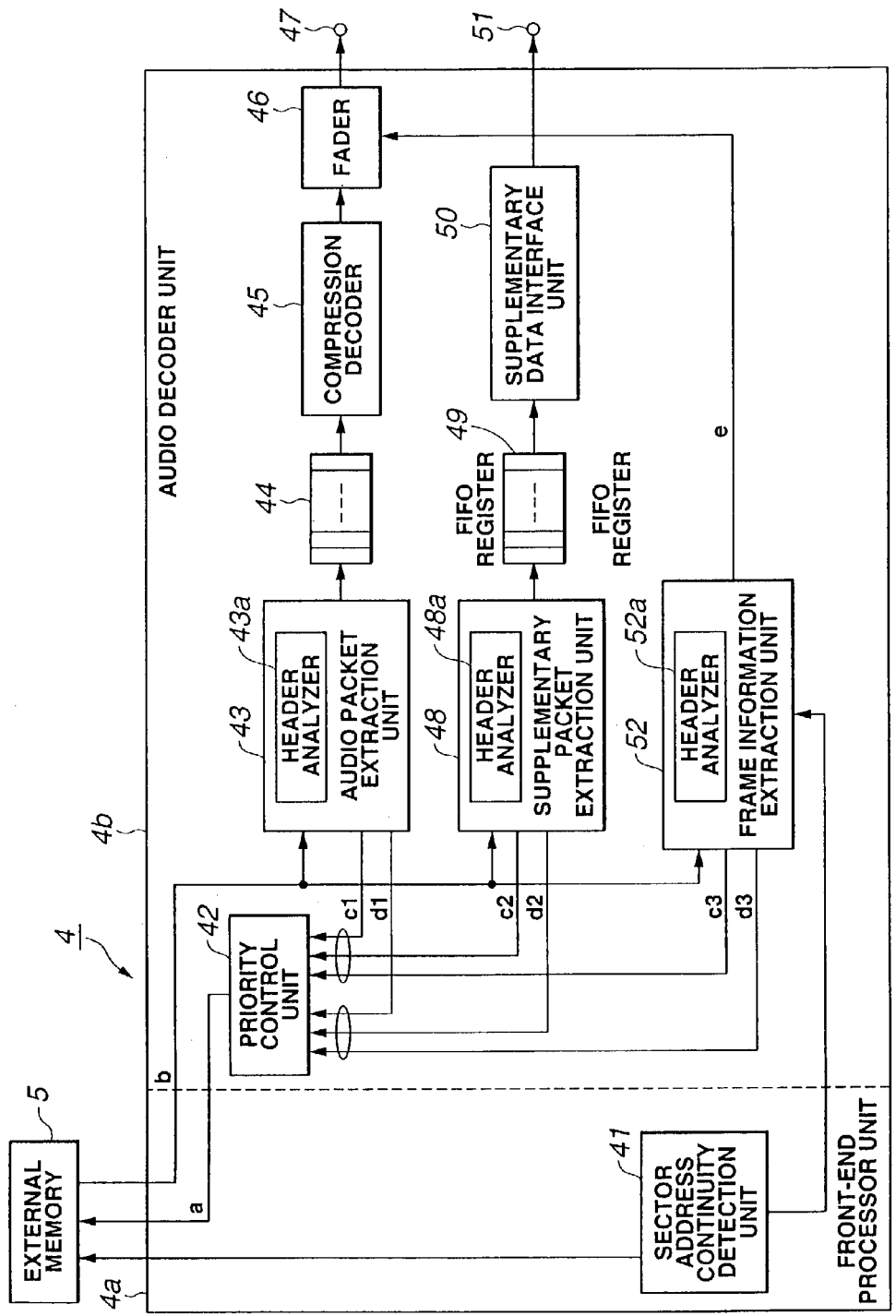
FIG. 10 is a block diagram showing the detailed structure of a data processing device constituting the optical disc reproducing device according to the present invention.

The front-end processor unit 4a constituting the data processing device 4 shown in FIG. 10 has a sector address continuity detection unit 41 to detect whether the addresses of sectors stored in the external memory are continuous or not. If frame data is jumped in accordance with a cue/review operation or a tune selection operation by a user, the sector address numbers become discontinuous.

When continuity of the sector address cannot be detected by the sector address continuity detection unit 41, that is, when discontinuity of the sector address is detected, the result of detection is supplied to a frame information extraction unit 52, which will be described later, via a priority control unit 42.

The audio decoder unit 4b has, in parallel, an audio packet extraction unit 43 for extraction an audio packet made up of audio data from a sector data input b from the external memory 5 connected to the front-end processor unit 4a, a supplementary packet extraction unit 48 for extracting a supplementary packet made up of supplementary data, and the frame information extraction unit 52.

At the leading end of each sector, an audio header (Audio_Header) is stored. To analyze the audio header, the audio packet extraction unit 43, the supplementary packet extraction unit 48 and the frame information extraction unit 52 independently have header analyzers 43a, 48a and 52a, respectively.

Generally, frame data is written over a plurality of sectors. Since the audio packet extraction unit 43, the supplementary packet extraction unit 48 and the frame information extraction unit 52 reads only necessary parts of data and operate independently, these extraction units do not necessarily process the same sector. Therefore, the audio header analyzers 43a, 48a and 52a are separately provided.

In the audio header, the type and length of each packet included in that sector, and information such as whether or not it is the leading packet of the frame are described, as shown in FIG. 11. Particularly, N_Sectors indicating the number of sectors used in that frame is described in the frame information (Frame_Info), as shown in FIG. 12. The header analyzers 43a, 48a and 52a analyze such audio headers.

The audio packet extraction unit 43 is connected to an audio data FIFO register 44. The audio data FIFO register 44 is connected to a compression decoder 45, which is connected to a fader 46.

The supplementary packet extraction unit 48 is connected to a supplementary FIFO register 49. The supplementary FIFO register 49 is connected to a supplementary data interface unit 50. The frame information extraction unit 52 is connected to the fader 46.

The audio decoder unit 4b has the priority control unit 42 and gives an order of priority in accordance with data request signals d1, d2, d3 outputted from the audio packet extraction unit 43, the supplementary packet extraction unit 48 and the frame information extraction unit 52. The audio decoder unit 4b then select a sector number and a byte address c1, c2, c3 from one of the extraction units and outputs a memory read address a.

Figure 1:
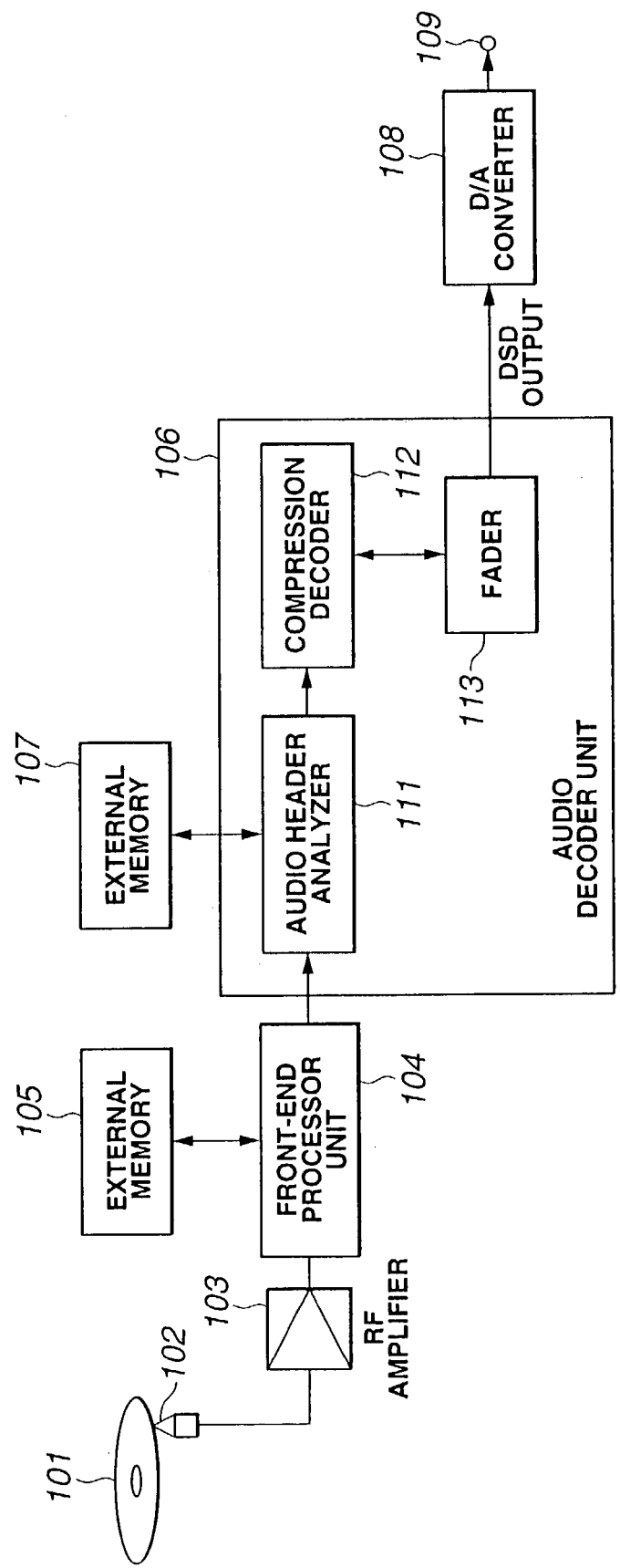
FIG. 1 is a block diagram showing a conventional audio data reproducing device.
Figure 2:
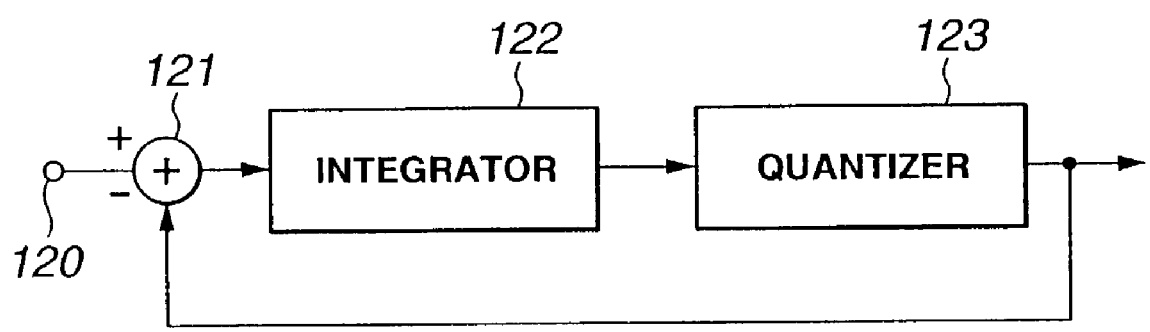
FIG. 2 is a block diagram showing a $\Delta\Sigma$ modulator based on the DSD system.
Figure 3:
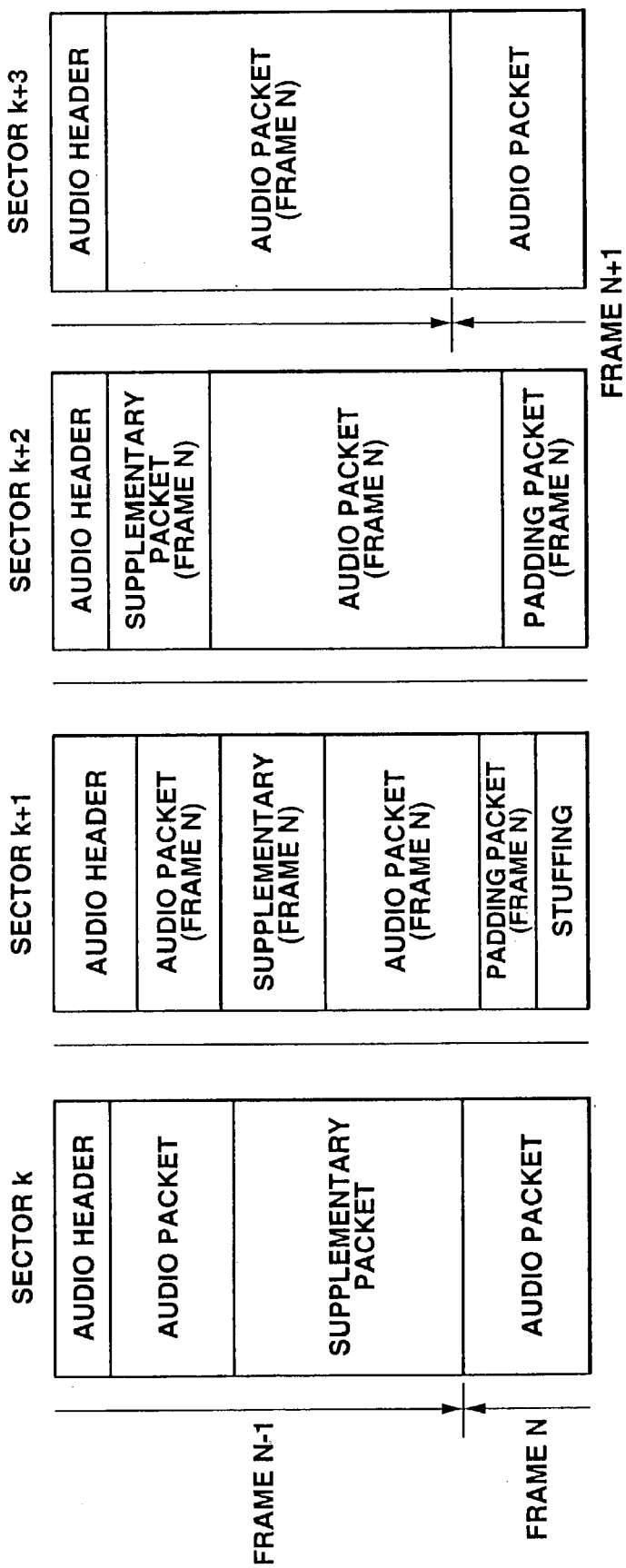
FIG. 3 shows sector data stored in an external memory connected to a front-end processor unit constituting the audio data reproducing device shown in FIG. 1.
Figure 4:
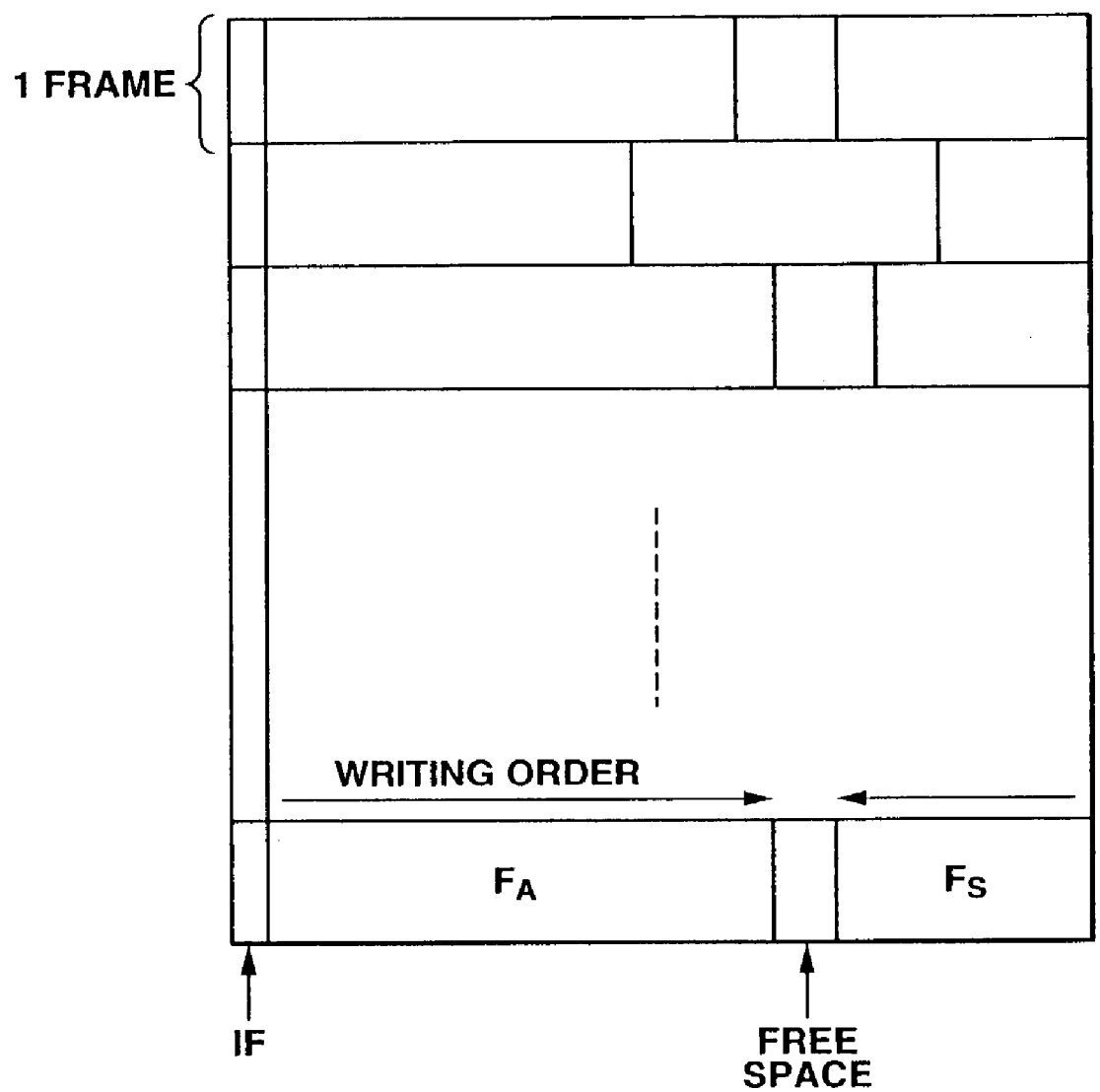
FIG. 4 shows data recorded by $1/75$-second frame each, into a block of a external memory connected to an audio decoder unit constituting the audio data reproducing device shown in FIG. 1.
Figure 5:
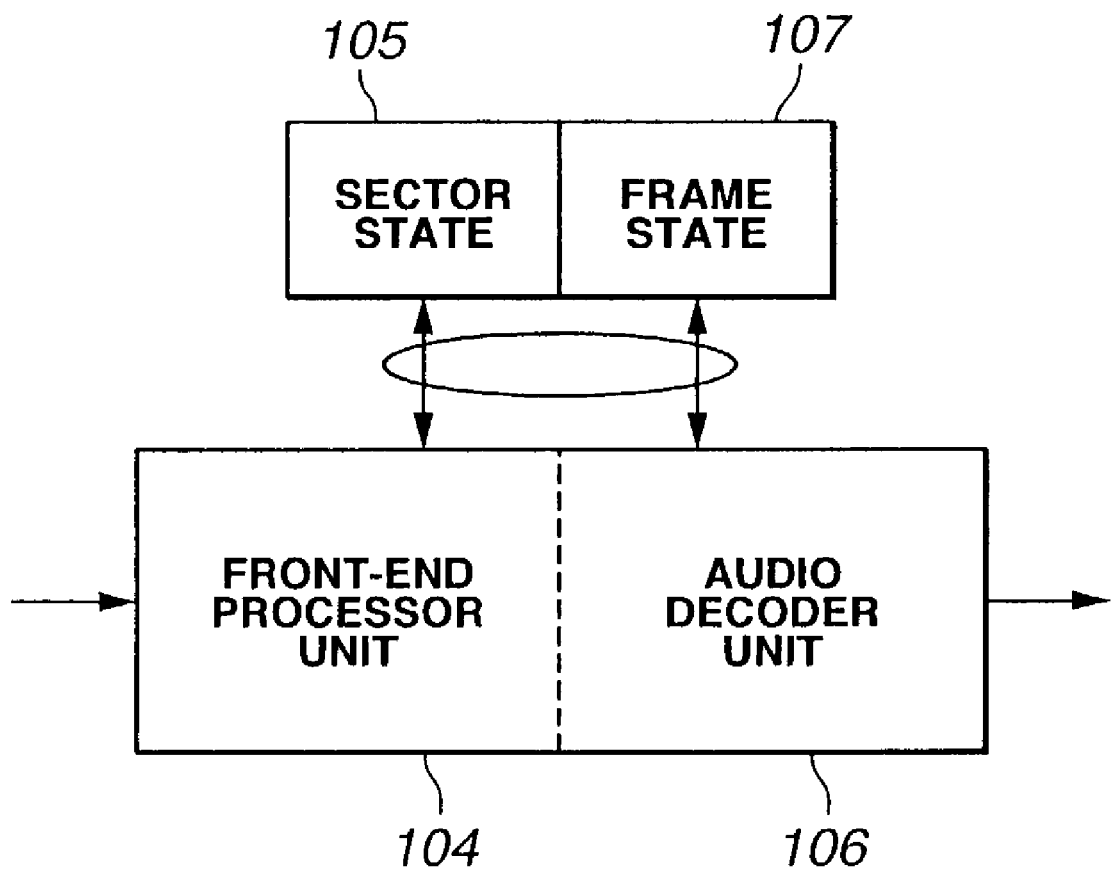
FIG. 5 shows division of a memory area by address in which the external memory connected to the front-end processor unit of the audio data reproducing device shown in FIG. 1 and the external memory connected to the SACD decoder unit are collectively provided.

Hereinafter, the operation of the data processing device 4 shown in FIG. 10 will be described with reference to the above-described FIG. 3. FIG. 3 shows sector-based data stored in the external memory 5.

First, the audio packet extraction unit 43 reads only data of an audio packet from the external memory 5 while analyzing an audio header by using the header analyzer 43a. Specifically, from the contents of the audio header of the present target sector, the type and length of each packet included in that sector and information about whether or not it is the leading packet of the frame are analyzed, and a byte address indicating where the audio packet data is written in the sector is calculated.

This byte address and the sector number of the present target sector are outputted, thus controlling the byte address to skip the other packets than the audio packet.

Even when reading of all the data of the audio packets included in the target sector is completed, if the leading packet of the next frame is not found, the sector number is incremented and the next sector becomes a target sector. After the audio header of the new target sector is analyzed, reading of data of the audio packets is continued.

As reading of all the data of the audio packets existing before the leading packet of the next frame is completed, the audio packet extraction unit 43 is on standby for the start of the next frame.

The data which is actually read out from the external memory 5 when the data request signal d1 from the audio packet extraction unit 43 is selected by the priority control unit 42, is stored into the audio data FIFO register 44. The compression decoder 45 on the subsequent stage takes therein effective data stored in the audio data FIFO register 44, when necessary.

As the supplementary packet, padding packet and stuffing data are skipped, the compression decoder 45 can receive the data of a necessary audio frame without having to wait even if there is no buffer memory for the frame state.

The number of stages of the audio FIFO register 44 may be a number which is enough for supplying data to the compression decoder 45 while analyzing the audio header when the audio packet extraction unit 43 shifts the read target sector to a new sector. Since the number of times the audio header is analyzed in one frame is limited, the audio FIFO register 44 may have a minimum necessary number of stage in consideration of this.

The supplementary packet extraction unit 48 reads out only data of a supplementary packet from the external memory 5 while analyzing an audio header by using the header analyzer 48a. Specifically, from the contents of the audio header of the present target sector, the supplementary extraction unit 48 detects the type and length of each packet included in that sector and whether it is the leading packet of the frame or not, and calculates a byte address indicating whether supplementary packet data is written in the sector. This byte address and the sector number of the present target sector are outputted, and the byte address is controlled to skip the other packets than the supplementary packet. Even when reading of all the data of the supplementary packets included in the target sector is completed, if the leading packet of the next frame is not found, the supplementary packet extraction unit 48 increments the sector number to use the next sector as a target sector. After analyzing the audio header of the new target sector, the supplementary packet extraction unit 48 continues reading the data of the supplementary packets. When reading of all the data of the supplementary packets existing before the leading packet of the next frame is completed, the supplementary packet extraction unit 48 is on standby for the start of the next frame.

The data which is actually read out from the external memory 5 when the data request signal d2 from the supplementary packet extraction unit 48 is selected by the priority control unit 42, is stored into the supplementary data FIFO register 49. If there is effective data in the supplementary data FIFO register 49, the supplementary data interface unit 50 on the subsequent stage reads out and outputs the effective data to an output terminal 51.

If there is no particular limitation to timing for the external output of the supplementary data, the supplementary data FIFO register 49 is not necessary.

The frame information extraction unit 52 examines whether all the sectors constituting a frame Fn+1, which is next to a frame Fn currently processed by the audio packet extraction unit 43 and the supplementary packet extraction unit 48, are prepared in the external memory 5, and whether these sectors do not include error data, while analyzing the audio header by using the header analyzer 52a. Moreover, from the extracted frame information, the frame information extraction unit 52 determines whether or not the sector data stored in the external memory 5 is the last data of the final frame completed in recording in the external memory 5. The frame information extraction unit 52 receives a detection result to the effect that the sector addresses are discontinuous, from the address continuity detection unit 41 via the priority control unit 42.

When all the sectors constituting the frame Fn+1 which is next to the currently processed frame Fn are not prepared in the external memory 5, or when the sectors include an error frame, or when the sector data is the last data of the final frame, or when the sector addresses are discontinuous, the frame information extraction unit 52 supplies an error signal e to the fader 46 and thus causes the fader 46 to perform fade processing on the DSD decode signal from the compression decoder.

A specific example of the processing in the above-described frame information extraction unit 52 will now be described with reference to FIGS. 13 to 16.

First, the processing to confirm whether or not all the sectors constituting the frame Fn+1, which is next to the currently processed frame Fn, are prepared in the external memory 5, will be described with reference to two cases shown in FIGS. 13 and 14.

Figure 13:
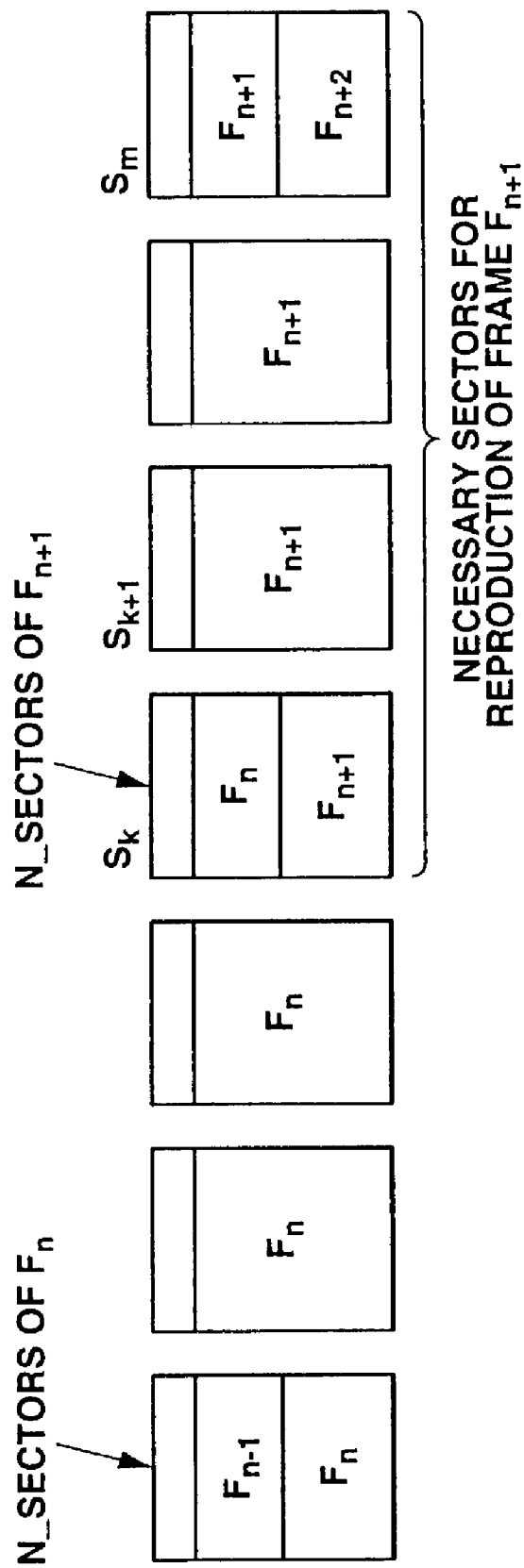
FIG. 13 is a view for explaining a first specific example of processing to confirm that a sector constituting a frame Fn+1 next to the currently processed frame Fn is prepared in all external memories.

In FIG. 13, from the contents of N_Sectors (in this case, 4) indicating the number of sectors used in the frame, written in an audio header A_H of a sector including the leading packet of the frame Fn, the sector number k of a sector Sk including the last packet of the frame Fn can be calculated. Therefore, it can be seen that the leading packet of the frame Fn+1 is included in the sector Sk or in a sector Sk+1. In this case, since N_Sectors of the frame Fn+1 is written in the audio header of the sector Sk shown in FIG. 13, it can be seen that the leading packet of the frame Fn+1 is also included in the sector Sk. Therefore, as the audio header of the sector Sk is analyzed, the sector number m of a sector Sm including the last packet of the frame Fn+1 can be found from the contents of N_Sectors (in this case, 4), and it can be seen that all the sectors from the sector Sk to the sector Sm necessary for reproducing the frame Fn+1 have already been written in the external memory 5.

Figure 14:
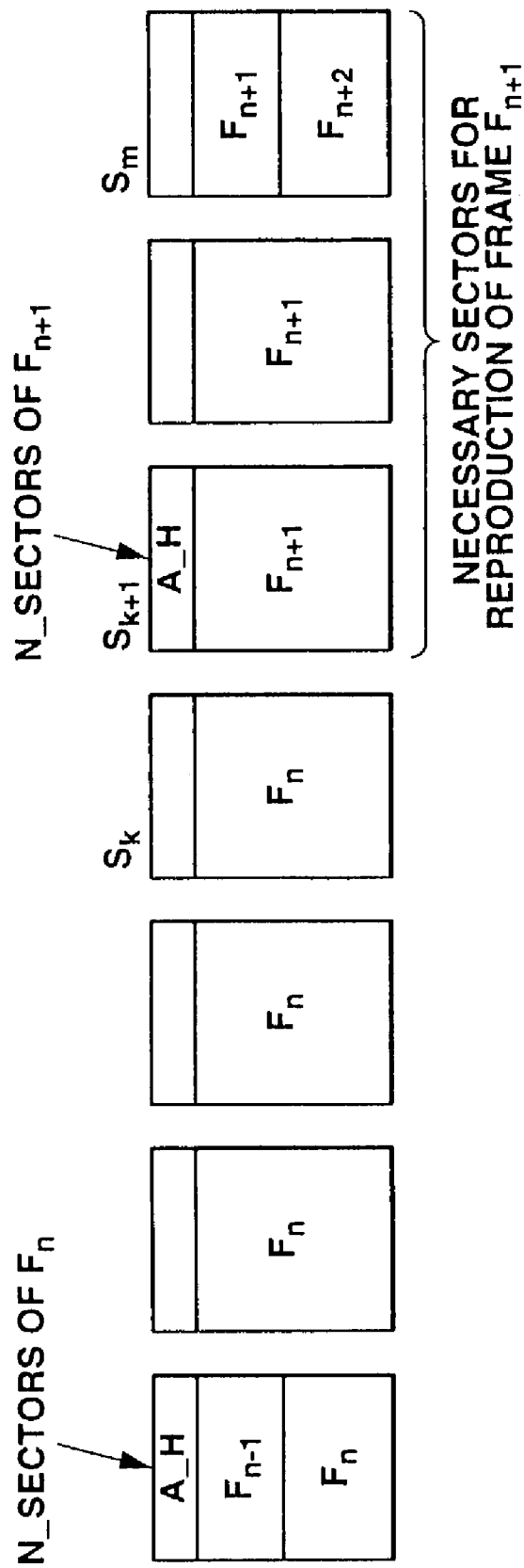
FIG. 14 is a view for explaining a second specific example of processing to confirm that a sector constituting a frame Fn+1 next to the currently processed frame Fn is prepared in all external memories.

In FIG. 14, since the sector number k of a sector Sk including the last packet of the frame Fn can be calculated from the contents of N_Sectors (in this case, 4) and N_Sectors of the frame Fn+1 is not written in the audio header A_H of the sector Sk, it can be seen that the leading packet of the frame Fn+1 is included not in the sector Sk but in a sector Sk+1. This is the case where the end of the frame Fn is coincident with the end of the sector Sk. Therefore, as the audio header of the sector Sk+1 is analyzed, the sector number m of a sector Sm including the last packet of the frame Fn+1 can be found from the contents of N_Sectors (in this case, 3), and it can be seen that all the sectors from the sector Sk+1 to the sector Sm necessary for reproducing the frame Fn+1 have already been written in the external memory 5.

If the sectors from the sector Sk to the sector Sm have not been written yet in the external memory 5, the preparation for the frame Fn+1 is not done yet and therefore the frame information extraction unit 52 outputs an error signal e to the fader 46.

If these sectors contain error data, the frame Fn+1 is an error frame. Therefore, also in this case, the frame information extraction unit 52 outputs an error signal e to the fader 46.

A specific example of the processing in the case where frame data contain an error signal will now be described with reference to FIGS. 15A to 15E.

When it is determined by the frame information extraction unit 52 that the frame Fn+1 is an error frame, as shown in FIG. 15A, an error signal e shown in FIG. 15C need be outputted to the fader 46 Tf seconds before the start of the frame Fn+1, which is a time required for fade-out. Therefore, priority control is performed so that the processing by the frame information extraction unit 52 with respect to the frame Fn+1 ends within ($1/75$−Tf) seconds from the start of the frame n. Thus, the error signal e can be outputted to the fader 46 at appropriate timing even without having a buffer for the frame state.

The fader 46 attenuates the fader gain from 0 db to −∞ db to fade out the frame data based on the DSD system, as shown in FIG. 15D.

When the error frame Fn+1 ends, the fader 46 is notified of the absence of the error before the start of the frame Fn+2 and is caused to raise the fader gain from −∞ db to 0 db, thus fading in the frame data Fn+2.

A specific example of the processing by the frame information extraction unit 52 in the case where a detection result showing discontinuity of sector addresses is received from the sector address continuity detection unit 41, will now be described with reference to FIGS. 15B to 15E.

This is the processing which occurs when a cue/review or tune selection operation is carried out by the user. When there is a discontinuous point in the frame data, that is, when it is found that the frame Fn and the frame Fm are discontinuous as shown in FIG. 15B from the result of detection by the sector address continuity detection unit 41, received by the frame information extraction unit 52 through the priority control unit 42, the frame information extraction unit 52 outputs the error signal e shown in FIG. 15C to the fader 46 Tf seconds before the start of the frame n+1, which is a time required for fade-out.

In accordance with this timing, the fader 46 attenuates the fader gain shown in FIG. 15D from 0 db to −∞ db to fade out the frame data based on the DSD system.

This phenomenon of frame discontinuity will be described in detail with reference to FIG. 16.

Figure 16:
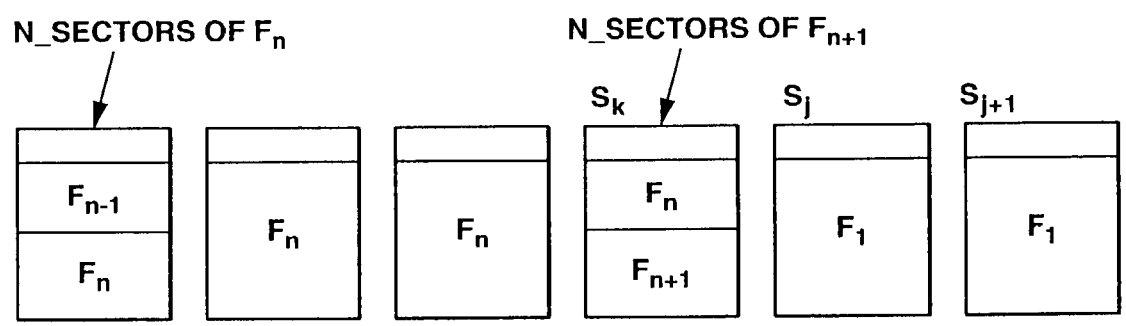
FIG. 16 is a view for explaining the details of a phenomenon of frame discontinuity.

In FIG. 16, the sector number k of a sector Sk including the last packet of the frame Fn can be calculated from the contents of N_Sectors (in this case, 4), and it can be seen that the leading packet of the frame Fn+1 is included in the sector Sk. Therefore, as the audio header of the sector Sk is analyzed, the sector number m of a sector Sm including the last packet of the frame Fn+1 can be found from the contents of N_Sectors (also in this case, not less than 2). However, the next sector is not a sector Sk+1 but a sector Sj, and the sector numbers are discontinuous j≠k+1).

Therefore, the frame Fn+1 cannot be reproduced and also a frame F1 is processed as an error frame.

When the frame data is jumped in accordance with a cue/review or tune selection operation as described above, if the sector numbers are discontinuous, the frame next to the frame Fn is a discontinuous frame. Therefore, again, an error signal is outputted to the fader 46 on the subsequent stage.

Next, the processing in the case where it is determined from the extracted frame information that the sector data stored in the external memory 5 is the last data of the final frame completed in recording in the external memory 5, will be described with reference to FIGS. 15E to 15G. This determination is made as the frame information extraction unit 52 reads the time code written in the frame information.

When the final frame exists in the frame data as shown in FIG. 15E, an error signal e may be outputted to the fader 46 Tf seconds before the end point, which is a time required for fade-out. Thus, the fader 46 attenuates the fader gain from 0 db to −∞ db as shown in FIG. 15G in accordance with that timing and thus fades out the frame data based on the DSD system.

In the above description, the external memory 5 is externally connected to the one-chip data processing device 4. However, the external memory may be provided inside the data processing device.

INDUSTRIAL APPLICABILITY

According to the present invention, as a buffer memory for the frame state is not necessary when collectively providing a front-end processor unit and a SACD decoder unit on one chip, external memories which would be conventionally connected to respective ICs can be provided as a single memory. Moreover, since the number of accesses to the memory is not largely different from the number of accesses to the memory which would be conventionally connected to the front-end processor unit, a high-speed clock need not be used.

What is claimed is:

1. A data processing device comprising:
   sector data generation means for performing predetermined signal processing on an input signal and generating fixed-length sector data therefrom for forming a variable-length frame;
   a single external memory for storing the fixed-length sector data generated by the sector data generation means;
   main packet extraction means for extracting main packet data from the fixed-length sector data stored in the single external memory;
   supplementary packet extraction means provided in parallel with said main packet extraction means for extracting supplementary packet data from the fixed-length sector data stored in the single external memory; and
   frame information extraction means provided in parallel with said main packet extraction means and said supplemetary packet extraction means for extracting frame information related to a frame with fixed length from the fixed-length sector data stored in the single external memory.

2. The data processing device as claimed in clam 1, further comprising control means for giving an order of priority to data request signals outputted from the main packet extraction means and the supplementary packet extraction means and causing the single external memory to output respective packet data corresponding to the data request signals in accordance with the order of priority.

3. The data processing device as claimed in claim 1, further comprising control means for giving an order of priority to data request signals outputted from the main packet extraction means, the supplementary packet extraction means and the frame information extraction means, and causing the single external memory to output respective packet data corresponding to the data request signals in accordance with the order of priority.

4. The data processing device as claimed in claim 3, further comprising fade processing means for performing fade-out and/or fade-in processing on the main packet data extracted by the main packet extraction means.

5. The data processing device as claimed in claim 4, wherein the frame information extraction means controls the fade processing means based on extracted frame information extracted by the frame information extraction means.

6. The data processing device as claimed in claim 5, wherein the frame information extraction means detects a position of an error frame from the extracted frame information for use in controlling the fade processing means.

7. The data processing device as claimed in claim 5, wherein the frame information extraction means determines a frame number of the fixed-length sector data stored in the single external memory from the extracted frame information for use in controlling the fade processing means.

8. The data processing device as claimed in claim 5, wherein the frame information extraction means determines whether the fixed-length soccer data stored in the single external memory is last data of a final frame completed in recording within the single external memory from the extracted frame information for use in controlling the fade processing means.

9. The data processing device as claimed in claim 5, further comprising sector address continuity detection means for detecting continuity of addresses of the fixed-length sector data stored in the single external memory, wherein the frame information extraction means controls the fade processing means in accordance with a result of detection from the sector address continuity detection means.

10. The data processing device as claimed in claim 7, wherein the frame information extraction means determines whether there is a change in frame number within single sector data based on the extracted frame information.

11. The data processing device as claimed in claim 7, wherein the frame information extraction means determines whether switching of continuous frame numbers is coincident with switching of sector numbers, based on the extracted frame information.

12. The data processing device as claimed in claim 9, wherein the sector data generation means incorporates therein the sector address continuity detection means and is a base for constituting a one-chip component together with the main packet extraction means, the supplementary packet extraction means, the control means, the frame information extraction means, and the fade processing means.

13. A data processing method comprising:
   a sector data generation step of performing predetermined signal processing on an input signal and generating fixed-length sector data therefrom for forming a variable-length frame;
   a data storage step of storing the fixed-length sector data generated in said sector data generation step in a single external memory;
   a main packet extraction step of extracting main packet data from the single external memory in which the fixed-length sector data generated by the sector data generation step is stored;
   a supplementary packet extraction step of extracting supplementary packet data from the single external memory; and
   a frame information extraction step of extracting frame information related to the variable-length frame from the single external memory,
   wherein an order of priority is set with respect to data request signals outputted from the main packet extraction step, the supplementary packet extraction step, and the frame information extraction step and respective packet data corresponding to the data request signals are outputted from the single external memory in accordance with the order of priority.

14. The data processing method as claimed in claim 13, further comprising a fade processing step of performing fade-out and/or fade-in processing on the main packet data extracted at the main packet extraction step.

15. The data processing method as claimed in claim 14, wherein at the frame information extraction step, the fade processing step is controlled on the basis of extracted frame information extracted in the frame information extraction step.

16. The data processing method as claimed in claim 15, wherein at the frame information extraction step, a position of an error frame is detected from the extracted frame information for use in controlling the fade processing step.

17. The data processing method as claimed in claim 15, wherein at the frame information extraction step, a frame number of the fixed-length sector data stored in the single external memory is determined from the extracted frame information for use in controlling the fade processing step.

18. The data processing method as claimed in claim 15, wherein at the frame information extraction step, whether the fixed-length sector data stored in the single external memory is last data of a final frame completed in recording within the single external memory is determined from the extracted frame information for use in controlling the fade processing step.

19. The data processing method as claimed in claim 15, further comprising a sector address continuity detection step of detecting continuity of addresses of the fixed-length sector data stored in the single external memory, wherein at the frame information extraction step, the fade processing step is controlled in accordance with a result of detection from the sector address continuity detection step.

20. The data processing method as claimed in claim 17, wherein at the frame information extraction step, whether there is a change in frame number within single sector data is determined from the extracted frame information.

21. The data processing method as claimed in claim 17, wherein at the frame information extraction step, whether switching of continuous frame numbers is coincident with switching of sector numbers is determined from the extracted frame information.

\* \* \* \* \*